United States Patent [19]

Ter-Borch et al.

[11] 4,243,522
[45] Jan. 6, 1981

[54] METHOD AND APPARATUS FOR UTILIZING HEAT CONTENT IN WASTE WATER

[75] Inventors: Poul E. Ter-Borch, Roskilde; Per Baumgarten, Hvidovre; Ernst K. Jørgensen, Valby, all of Denmark

[73] Assignee: I. Kruger A/S, Denmark

[21] Appl. No.: 50,537

[22] Filed: Jun. 21, 1979

[30] Foreign Application Priority Data

Jun. 22, 1978 [DK] Denmark .......................... 2820/78

[51] Int. Cl.³ .............................................. C02F 3/00
[52] U.S. Cl. .................................. 210/774; 210/97; 210/181; 210/918; 62/238 E; 62/324 D
[58] Field of Search ................... 210/7, 10, 12, 15, 71, 210/3, 175, 181, 182, 177, 178, 104, 123, 127, 97, 101; 62/238 E, 324 D

[56] References Cited

U.S. PATENT DOCUMENTS

| 2,765,919 | 10/1956 | Juell | 210/123 |
|---|---|---|---|
| 3,549,521 | 9/1969 | Stevens | 210/101 |
| 3,824,186 | 7/1974 | Erickson | 210/7 |
| 3,920,550 | 11/1975 | Farrell | 210/104 |
| 3,986,344 | 10/1976 | Newman | 62/238 E |
| 4,006,857 | 2/1977 | Adrian | 62/238 E |
| 4,042,012 | 8/1977 | Perry et al. | 62/238 E |
| 4,184,856 | 1/1980 | Thorén | 210/71 |

FOREIGN PATENT DOCUMENTS 197711  11/1977  U.S.S.R. ..................................... 62/238

*Primary Examiner*—Ernest G. Therkorn
*Attorney, Agent, or Firm*—Steinberg & Raskin

[57] ABSTRACT

Method and apparatus for utilizing the heat content in waste water which has passed through a biological purification plant, the last step of which comprises subjecting the waste water to sedimentation in a settlement tank. A heat pump is provided having an evaporator section which is heated by means of the waste water which has been purified in the settlement tank which is directed to it through a first conduit. During periods in which the flow rate of the waste water through the purification plant is less than the average flow rate which corresponds to the capacity of the heat pump, at least a portion of the waste water which flows through the evaporator of the heat pump is recirculated to the settlement tank, the latter being utilized as a heat reservoir according to the present invention.

3 Claims, 2 Drawing Figures

METHOD AND APPARATUS FOR UTILIZING HEAT CONTENT IN WASTE WATER

BACKGROUND OF THE INVENTION

This invention relates generally to methods and apparatus for utilizing or recovering the heat content in waste water and, more particularly, to a method and apparatus for utilizing or recovering by means of a heat pump, the heat content in waste water which has passed through a biological purification plant in which the last step comprises sedimentation of the waste water in a settlement tank. According to the invention, the evaporator section of the heat pump is heated by means of the purified waste water subsequent to sedimentation.

It is well known that in order to operate a heat pump in an economic manner, it is necessary to operate the heat pump at substantially its full capacity. This condition requires that the capacity of the heat pump, when utilized in conjunction with a heat source having a varying output, not substantially exceed the minimum output of the heat source. In a biological waste water purification plant, the rate of flow of the waste water normally follows a curve which as a function of time has the approximate shape of a sine curve, the minimum flow rate being about $\frac{1}{4}$ of the maximum flow rate. Thus, when the capacity of the heat pump corresponds to the minimum flow rate of the waste water through the purification plant, only about $\frac{1}{2}$ of the average heat from the heat source can be utilized.

Although it is possible to store the waste water in a reservoir in order to reduce the daily flow variations, such storage is practically precluded both for economic reasons and due to space requirements.

SUMMARY OF THE INVENTION

Accordingly, one object of the present invention is to provide a new and improved method and apparatus by which a heat pump having a capacity which corresponds to the average flow of the waste water through the purification plant can be used at its full capacity despite variations in the waste water flow rate.

Briefly, in accordance with the present invention, this and other objects are obtained by providing a method and apparatus wherein during periods in which the waste water flow rate through the purification plant is below the average flow rate, at least a portion of the flow of the waste water which has been directed into the evaporator section of the heat pump from the settlement tank is recirculated from the evaporator section back to the settlement tank.

According to the method of the invention, the settlement tank which typically has a volume which corresponds to about five times the hourly flow of the waste water is utilized as an equalizing reservoir. The water level in the settlement tank, however, is maintained at a substantially constant level so that the temperature is decreased during periods in which the waste water flow rate is small. However, calculations show that the decrease in temperature of the waste water in the settlement tank is so small that it is insignificant relative to the variations in the flow rate of the waste water and, therefore, the temperature decrease does not influence the efficiency of the heat pump or the functioning of the settlement tank. In this manner, the method of the present invention enables the utilization of the heat pump to its maximum capacity wherein the capacity of the evaporator corresponds to the allowable cooling of the waste water when it flows at its average flow rate.

According to the apparatus of the present invention, a heat pump is employed for utilizing or recovering the heat content contained in waste water which flows through a biological purification plant, the last step in which comprises sedimentation in a settlement tank. The heat pump has an evaporator section which is heated by the directing of a stream of purified waste water from the settlement tank to the evaporator section. A recirculating conduit connects an outlet of the evaporator section of the heat pump with the inlet of the settlement tank and valve means are disposed in the recirculating conduit in a manner such that at least a portion of the waste water flow which exceeds the flow rate of the waste water through the purification plant is recirculated to the settlement tank.

According to one embodiment of the invention, a pump is provided in the inlet pipe between the outlet of the settlement tank and the inlet to the evaporator section of the heat pump, the pump having an associated reservoir in which the waste water attains a certain level, which water level controls the valve which in turn controls the recirculation of the waste water to the settlement tank.

DESCRIPTION OF THE DRAWINGS

A more complete appreciation of the present invention and many of the attendant advantages thereof will be readily seen as the same becomes better understood in connection with the following detailed description when considered in connection with the accompanying drawings in which.

DESCRIPTION OF THE PREFERRED EMBODIMENT

Figure 1:
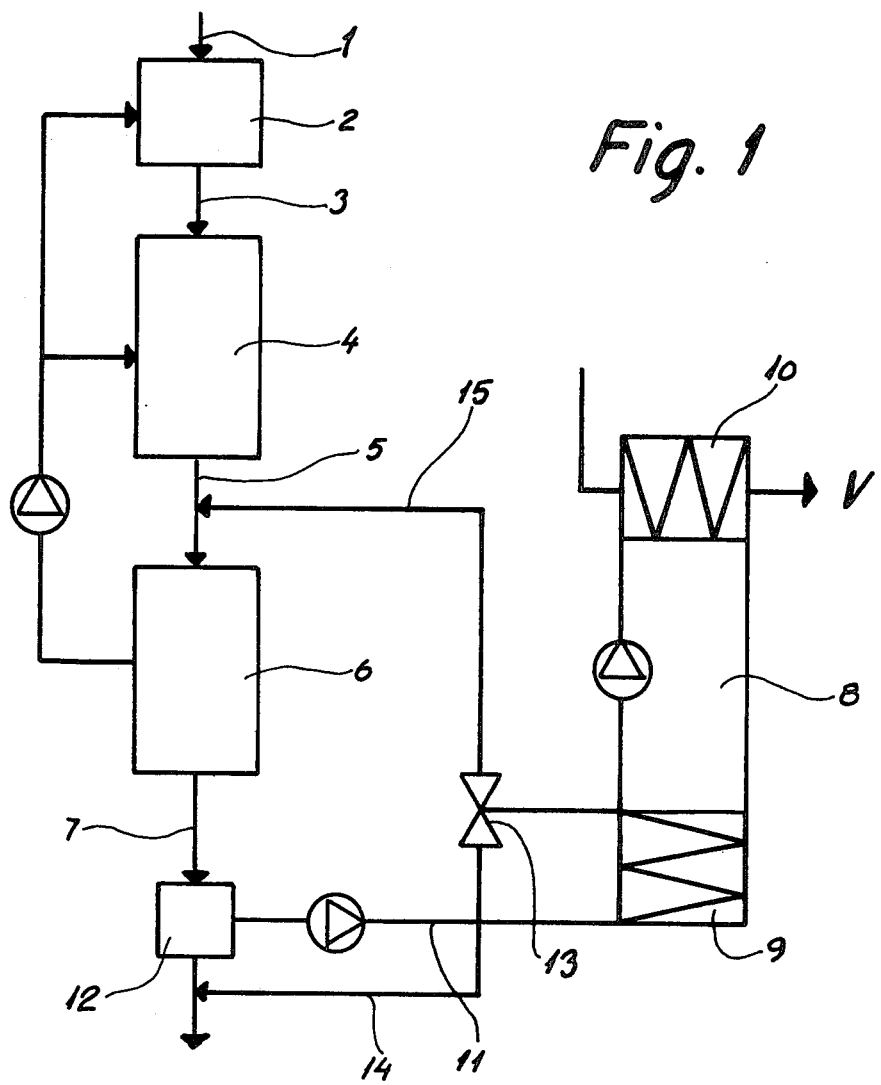
FIG. 1 is a schematic flow sheet diagram of a biological purification plant in conjunction with a heat pump illustrating the method and apparatus of the present invention.

Referring now to the drawings and, in particular, to FIG. 1, a biological purification plant for waste water is schematically illustrated. The waste water enters the plant through an inlet 1 and immediately enters a primary sedimentation tank 2 where the waste water remains for an average of between 1 and 2 hours. The waste water is directed from sedimentation tank 2 by means of a connecting pipe 3 to an aerating tank 4, the capacity of which corresponds to about 3 times the normal flow of the waste water during the day hours which constitute the hours during which the greatest flow of the waste water occurs. The waste water is directed from aerating tank 4 by means of a conduit 5 to a settlement tank 6 whose capacity corresponds to the capacity of the aerating tank 4. Sediment, such as sludge, which is deposited in sedimentation tank 6 is returned to the aerating tank 4 or, alternatively, to the primary sedimentation tank 2. Of course, it is understood that the primary sedimentation tank 2 as well as aerating tank 4 are not necessary elements of the method and apparatus of the present invention.

Figure 2:
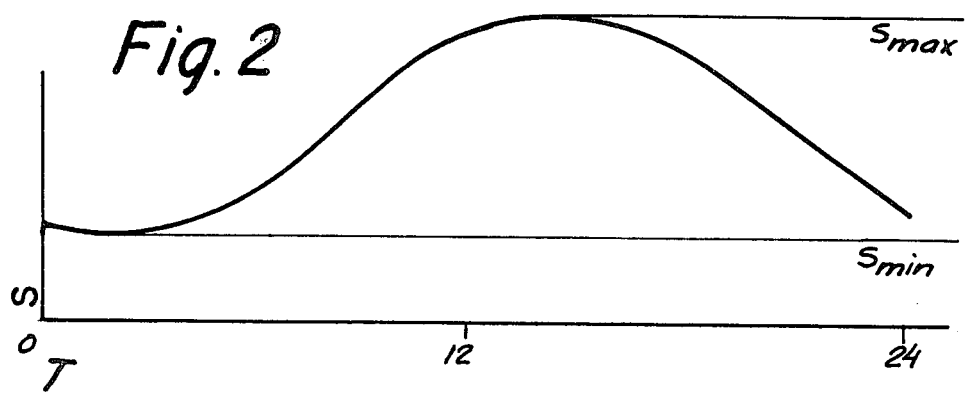
FIG. 2 is a graph illustrating the typical daily variation of the flow of waste water through a purification plant as a function of time.

Referring to FIG. 2, a typical variation of the rate of flow of the waste water in the biological purification plant as a function of the hours of the day is illustrated. Thus, it is seen that the maximum flow rate of the waste water, $S_{max}$, occurs during the daylight hours while the minimum flow rate $S_{min}$, occurs during the nighttime hours. Since the temperature of the waste water varies both with the particular time of the year and within the 24 hour period of each day, especially during the interval between 9 A.M. and 6 P.M., it is possible to use the waste water as a source of heat for a heat pump, the temperature of the waste water being sufficiently high that it can be reduced, such as by 5° C., without a risk of freezing.

Thus, according to the present invention, a heat pump 8 is provided having an evaporator section 9 and a condensor section 10. The purified waste water exits from the settlement tank 6 through a waste water outlet 7 and is directed into the evaporator section 9 of heat pump 8 through a conduit 11 in which is disposed a pump. Thus, the waste water outlet 7 and conduit 11 comprise together first conduit means which fluidly interconnect the outlet of the settlement tank 6 and the inlet of the evaporator section 9 of heat pump 8. The pump preferably is provided with a pump well or reservoir 12 to which the conduit 11 is connected. The evaporator section 9 of heat pump 8 is provided with an outlet conduit in which a valve 13 is disposed, the outlet conduit branching at valve 13 to an outlet passageway 14 whose downstream end is connected to the downstream side of reservoir 12 and a recirculating pipe 15 which is connected to the conduit 5 at the inlet settlement tank 6.

According to the present invention, the valve 13 is controlled by the height of the water level in the pump reservoir 12 in a manner such that a quantity of water which corresponds to the flow of the waste water at the inlet 1 of the plant is conducted through the outlet passageway 14. In this manner, it is possible to conduct waste water through the evaporator of the heat pump at a flow rate which is greater than the minimum flow rate $S_{min}$ as the excess portion of the waste water is passed through the recirculating pipe 15 to the settlement tank 6. The capacity of the settlement tank 6, however, is so large that the decrease in the temperature of the waste water during the nighttime hours which, of course, is the usual time when the rate of flow is below that of the average flow, will only amount to some 1°–2° C., assuming that the flow rate through the evaporator is approximately 80% of the average flow rate.

Thus, according to the method of the present invention, the settlement tank 6 functions not only for its primary purpose, i.e., sedimentation, but is also utilized as a heat reservoir in order to reduce the variations in the heat supplied to the heat pump. This enables a substantially full utilization of the capacity of the heat pump in connection with the purification plant with the heat pump having a capacity which corresponds to the average waste water flow rate.

Obviously, numerous modifications and variations of the present invention are possible in the light of the above teachings. It is therefore to be understood that within the scope of the appended claims, the invention may be practices otherwise than is specifically disclosed herein.

What is claimed is:

1. A method for utilizing the heat content of waste water which has passed through a biological waste water purification plant at a variable flow rate from which an average flow rate can be obtained, the last operation in said plant comprising directing the waste water into a sedimentation tank wherein the waste water is substantially purified, comprising the steps of:

directing a flow of the substantially purified waste water from the sedimentation tank to the evaporator of a heat pump having a capacity substantially corresponding to the average flow rate so that the evaporator is heated; and during periods in which the flow rate of the waste water is below said average flow rate, recirculating at least a portion of the waste water flowing through the evaporator back into the settlement tank which thereby functions as a heat reservoir.

2. Apparatus for utilizing the heat content of waste water which has passed through a biological waste water purification plant at a variable flow rate from which an average flow rate can be determined, the last operation in said plant comprising directing the waste water into a sedimentation tank wherein the waste water is substantially purified, comprising:

a settlement tank having an inlet through which said waste water enters said tank;

a heat pump having a capacity substantially corresponding to the average flow rate having an evaporator section;

first conduit means for directing said waste water from said settlement tank to said heat pump evaporator section to provide heat thereto;

second conduit means for recirculating at least a portion of said waste water from said heat pump evaporator section to said settlement tank; and valve means disposed in said second conduit means for directing, during periods in which the flow rate of the waste water through said settlement tank is below said average flow rate, at least a portion of said waste water to said settlement tank through said second conduit means, said settlement tank thereby functioning as a heat reservoir.

3. Apparatus as recited in claim 2 further including pump means located in said first conduit means, said pump means including a reservoir in which the waste water rises to a certain level, said valve means being controlled by the level of the waste water which accumulates in the pump reservoir.

* * * * *